3,174,867
CONTINUOUS BREAD MAKING METHOD
Charles G. Ferrari, Evanston, Ill., assignor to J. R. Short Milling Company, Chicago, Ill., a corporation of Illinois
No Drawing. Filed Nov. 20, 1961, Ser. No. 153,714
4 Claims. (Cl. 99—90)

This invention relates to the art of baking and specifically to an improved method and an improved composition for use in the continuous production of white bread.

Historically, white bread has been produced by batch processes in which a quantity of yeast-leavened dough is prepared and then processed, as a separate dough quantity, through various successive steps including the final step of baking. Batch processes for preparing bread require a relatively large amount of time and, by modern industrial standards, involve high labor costs. Accordingly, in recent years, the industry has sought to replace the batch baking procedures by a continuous method capable of minimizing both time and labor. At the present time, the industry is rapidly adopting a continuous process based on the initial preparation of an aqueous, yeast-fermented brew, continuous mixing of the brew with flour, shortening and an oxidant in a preliminary mixing zone to provide a uniform preliminary dough mixture, continuous working of the preliminary mixture in a dough developing zone in such fashion as to very rapidly provide a fully developed dough, depositing of the resulting dough in pans, and continuous processing of the panned dough through the baking step. This process is disclosed typically in United States Patent 2,931,320, issued April 5, 1960, to David Bandel, and 2,953,460, issued September 20, 1960, to John C. Baker, for example.

Though this continuous process has already achieved extensive commercial acceptance, it still faces important obstacles. One of the difficulties involved is that the bread produced by the continuous process has both a very bland flavor and a fine, soft, fragile internal structure resembling somewhat that of pound cake. To many persons, this combination of characteristics in bread has proved to be unappealing.

Following the approaches commonly used in batch baking procedures, the baker normally would attempt to improve both the flavor and internal structure of the bread from the continuous process by using additives of the bread improver type. Except as disclosed in United States Patent 3,006,765, issued to me on October 31, 1961, such attempts have met with little success in connection with the continuous process. Though the new continuous method, depending as it does on the use of both an initially prepared brew and a short-time, high-energy working step for developing the dough, presents many of the same difficulties faced in the conventional batch procedures, these difficulties are much more severe in the continuous process. Thus, in the continuous process, the use of a liquid brew militates against the successful use of additives early in the process, and the unique dough developing step makes it difficult to use additives successfully later in the process. In general, the conventional baking additives have been found simply to spend themselves uselessly in the continuous process.

It is accordingly a general object of the present invention to provide a method for making white bread continuously wherein the flavor and other characteristics of the finished product are markedly improved.

Another object is to provide an improved shortening composition for use in the continuous bread process.

Stated generally, these and other objects of the invention are attained by incorporation in the preliminary dough mixture relatively small quantities of certain edible enzyme-peroxidized oils, the peroxidized oil advantageously being combined with the shortening, including stearin flakes, in the form of a novel shortening composition.

Enzyme-peroxidized oils have long been known and were proposed broadly as bleaching agents in United States Patent 1,994,992, issued March 19, 1935, to Louis W. Haas and Herbert O. Renner, and for inclusion in doughs to bleach the same in United States Patent 1,994,993, issued March 19, 1935, to the same inventors. Included in bread doughs made by the conventional batch procedures, enzyme-peroxidized oils heretofore proposed were found to accomplish distinct bleaching in the dough when used in amounts equal to at least 0.5% of the weight of the flour employed. Unfortunately, inclusion of such an amount of the prior-art enzyme-peroxidized oils was found to produce in the finished baked goods flavors, usually described as oily, which are considered to be objectionable by many consumers.

Surprisingly, I have discovered that certain enzyme-peroxidized oils, when incorporated in particular proportions in the preliminary mixture in the continuous bread making procedure, will provide a marked flavor improvement in the finished bread. The present invention achieves flavor improvement adequate to make the bread from the continuous process equivalent to that made by the conventional batch procedures.

Stated generally, enzyme-peroxidized oils suitable for use in accordance with the invention are prepared by dispersing any of certain refined vegetable oils, alone or in combination, in an aqueous solution of lipoxidase derived from a legume source rich in triglyceride lipoxidase, the dispersion being agitated in such fashion that the oil is continuously exposed to oxygen so that enzyme-peroxidation can proceed, air being incorporated into the dispersion, typically, as the oxygen source.

As the oil, any enzyme-peroxidizable, edible, refined, vegetable oil having either no linolenic acid or only a negligible content thereof can be used. Thus, any vegetable oil containing substantial amounts of linoleic acid, but no or negligible linolenic acid, can be used. Oils which are most advantageous are cottonseed oil and peanut oil. Other oils suitable for use in accordance with the invention are corn oil, sesame oil, poppyseed oil, sunflower oil, wheat germ oil and oiticica oil. The oil employed should be refined and, advantageously, without added anti-oxidants. Soybean oil and safflower oil, for example, both relatively rich in linolenic acid, are unsuitable.

As the source of the active lipoxidase, any of the legume materials in particulate form can be employed, so long as the material employed is relatively rich in the triglyceride form of lipoxidase. Green peas, both smooth and wrinkled varieties, and peanuts are excellent sources of lipoxidase activity in accordance with the invention. For practical purposes, green peas are superior to peanuts because of the difficulties inherent in extracting the lipoxidase activity of the peanut. Under presently known conditions for accomplishing enzyme-peroxidation of the oil, the soybean, characterized not only by very high overall lipoxidase activity but also by a high proportion of the fatty acid type of lipoxidase, is not suitable as an enzyme source for the purposes of this invention because oils peroxidized by soybean lipoxidase tend to produce poor flavor in bread, rather than to improve the flavor. Similarly, lima beans and red beans, for example, both providing strong fatty acid lipoxidase activity, are not good choices as enzyme source material for use in the present invention. Triglyceride lipoxidase concentrates are suitable, even though they may contain substantial fatty acid lipoxidase.

When the particular peroxidized oils of this invention are introduced into the preliminary dough mixture during manufacture of white bread by the continuous process, substantial flavor improvement is always exhibited in the bread, and the flavor of the "continuous mix bread" can usually be made equivalent to that of white bread produced by the more conventional batch method. The reasons for success of the invention are not apparent. Undoubtedly, flavor improvement must arise at least in part from the fact that, once peroxidized, the oil is a more effective precursor of flavor bodies, including particularly carbonyl compounds such as aldehydes and ketones, which form during baking. It must also be recognized, however, that the enzyme peroxidation apparently accomplishes more than the simple addition of oxygen, and that the organoleptic characteristics of the oil itself are changed, for better or worse, depending upon the particular oil and enzyme source. Fat decomposition products are apparently formed in the oil which contribute to the flavor of the oil, and also to the flavor of bread made with the oil. In any event, flavor improvement in the continuous bread process is accomplished when the particular oils specified are peroxidized by triglyceride lipoxidase materials.

The present invention requires not only the use of the specific enzyme-peroxidized oils just defined but also that the enzyme-peroxidized oil employed have an active peroxide content, calculated as hydrogen peroxide, of 0.025–0.200 mole per kilogram. Such enzyme-peroxidized oils are employed in amounts equal to 0.1–1.0% of the weight of the wheat flour used in the dough. Markedly superior results in improving the flavor of the bread obtained from the continuous procedure are achieved when the peroxidized oil has an active peroxide content, caluated as hydrogen peroxide, of 0.140–0.150 mole per kilogram and is employed in an amount equal to only 0.2–0.5% of the flour weight.

PREPARATION OF PEROXIDIZED OIL

To obtain the desired peroxidized oil, the lipoxidase is first extracted from the source material, using water as the solvent, with a solvent-to-solids ratio of at least 10:1 by weight, extraction being effected by agitating for 5–30 mins. and then allowing the solid source material to settle. The aqueous extract is recovered in pure form and the oil then added thereto, the weight ratio of extract to oil being at least 1:1.5. Enzyme peroxidation is accomplished by agitating the oil-extract mixture for 1–6 hrs., the oil being promptly emulsified in the aqueous extract. Agitation is carried out sufficiently vigorously to assure introduction into the emulsion of air adequate for peroxidation by the enzyme.

Throughout the extraction and peroxidation, the aqueous composition is held at a temperature of 55–80° F. After peroxidation, the composition is centrifuged to recover a product in which the oil predominates but some water is present. The recovered liquid is then heated to at least 130° F. and, maintained at that temperature, is again centrifuged to recover a clear peroxidized oil, substantially free from water.

Example 1

One hundred gallons of tap water, at 60° F., is placed in a stainless steel mixing tank equipped with a propeller-type agitator, the agitator being driven at a rate adequate to provide a gentle stirring, without formation of a vortex in the liquid. Thirty-six pounds of enzymatically active flour from smooth green peas is then dumped into the tank and agitation continued for 10 mins. to accomplish extraction of the lipoxidase from the pea flour. Agitation is then stopped and the solids allowed to settle. The clear supernatant extract, amounting to 85 gal., is then siphoned off and run into a second mixing tank similar to the first.

To 60 gal. of the extract is then added 35 gal. of refined cottonseed oil. The agitator is driven continuously, with vigorous agitation effective to form a large vortex in the liquid, so that not only is the oil promptly emulsified in the water but also a considerable amount of air, as a source of oxygen, is incorporated in the liquid. Agitation is continued in this manner for 2 hrs., the remainder of the extract then added, and agitation continued for an additional period of approximately 2 hrs. As this additional period of agitation progresses, samples are taken and analyzed for active peroxide content of the oil. When the active peroxide content of the oil approaches 0.135 mole per kilogram of oil, the emulsion is transferred to a centrifuge and subjected to a first centrifugation for removal of most of the water, the emulsion still being at a temperature below 80° F. at this time.

The centrifugate is then heated to 140–150° F. and, while at this temperature, is again centrifuged, a clear, sparkling oil being recovered which is essentially free from water. This final peroxidized oil product has an active peroxide content, calculated as hydrogen peroxide, of 0.140–0.150 mole per kilogram.

PRODUCTION OF WHITE BREAD BY THE CONTINUOUS PROCESS IN ACCORDANCE WITH THE INVENTION

The method of the invention is applicable to the continuous process broadly, so long as the special enzyme-peroxidized oils, singly or in combination, are incorporated in purified form directly in the preliminary dough mixture formed by combining the yeast-fermented aqueous brew with dough-forming ingredients including at least flour, shortening and an effective oxidant. Operability of the invention does not appear to depend upon the specific brew composition, brews made without flour and brews made with a portion of the flour for the dough giving equivalent results insofar as the invention is concerned. Similarly, the specific details of the high-speed dough developer employed are not significant to the invention, so long as development is carried out by subjecting the preliminary dough mixture to such high speed mechanical working, at such a high energy level, that a fully developed dough results in a period on the order of from less than 1 min. to not more than 5 mins.

Example 2

Using the special enzyme-peroxidized oil of Example 1, the method of this invention was carried out in a full scale bakery employing equipment supplied by the American Machine & Foundry Company, New York, New York, and generally described on pages 10 and 11 of Bakers Weekly for August 14, 1961.

The brew formula employed, conventional for the equipment used, was as follows, amounts being for a 1 hr. run:

| Ingredient | Weight | |
| --- | --- | --- |
| | Lbs. | Oz. |
| Flour | 364 | |
| Water | 1,510 | |
| Yeast food | 15 | |
| Yeast | 78 | |
| Liquid sugar (30% $H_2O$) | 275 | |
| Milk solids, non-fat | 140 | |
| Salt | 53 | 5 |
| Mold Inhibitor | 3 | |
| Commercial flavor additive comprising a culture of lactic organisms | | 4 |

The brew was prepared in conventional fashion, the ingredients (save for 70% of the sugar) being blended and held for 2 hrs., with agitation, before delivery to the "liquid sponge tank." In that tank, the balance of the sugar was added and agitation then continued for an additional hour, after which the brew was ready to be pumped to the preliminary mixer.

The total amount of flour, other than that in the brew, for the 1-hr. run was 2236 lbs.

The enzyme-peroxidized oil was combined with the shortening, the composition being as follows for the 1-hr. run:

| Ingredient | Weight | |
|---|---|---|
| | Lbs. | Oz. |
| Lard, containing monoglycerides | 82 | 4.7 |
| Stearin flakes | | 4.8 |
| Enzyme-peroxidized oil of Example 1 | 7 | 6.5 |

A liquid oxidant solution was employed, consisting of 50 lbs. water, 73.8 g. potassium bromate and 12.3 g. potassium iodate, for the 1-hr. run.

The brew, flour, shortening composition and oxidant were metered into the preliminary mixer, which operated to provide a uniform preliminary dough mix which was pumped continuously to the dough developer. The dough from the developer was panned, proofed and baked in conventional manner for this equipment.

In order to obtain a control bread, an additional run was made under the same conditions, omitting the special peroxidized oil. In this control run, the shortening composition contained only lard and stearin flakes.

The bread obtained in accordance with this example, by use of the special enzyme-peroxidized oil of Example 1, was found to have a flavor markedly superior to that of the control bread, the flavor being equal to that of bread made by conventional batch methods and available in the local trade.

The same procedure was repeated, using various proportions, ranging from .05%–1.0% of the flour weight, of refined vegetable oils which had been peroxidized by legume materials, particularly soybean flour, rich in fatty acid lipoxidase. The bread so obtained was found to have an objectionable flavor, usually characterized as "paint-like," "oily" or "like linseed oil," this flavor frequently increasing with the age of the bread. The objectionable flavor was found to be more distinct when the peroxidized oil employed was soybean oil, rich in linolenic acid.

Numerous test bakes carried out in accordance with this example demonstrate that success of the invention depends upon careful limitation of the amount of peroxide activity carried into the dough by the peroxidized oil. Thus, with the active peroxide content of the oil in the range of 0.025–0.200 mole per kilogram, computed as hydrogen peroxide, the quantity of oil employed in the dough is varied inversely as the active peroxide content thereof.

It will be understood that the special enzyme-peroxidized oils are employed in accordance with the invention as flavor-promoting agents. I have found that the flavor of the bread produced in accordance with Example 2 is improved when, in addition to the enzyme-peroxidized oil, an amount of a butter flavor agent equal to 0.01–0.10% of the weight of the oil is also incorporated. Thus, I can employ as the butter flavor agent a natural butter flavor extract or concentrate, diacetyl, or any of the aliphatic esters of lower molecular weight fatty acids, including particularly the methyl, ethyl, propyl and butyl esters. Ethyl butyrate, for example, is an excellent butter flavor agent, useful alone or in conjunction with other natural or synthetic butter flavors.

The procedure of Example 2 has been duplicated with the addition of diacetyl to the enzyme-peroxidized oil in an amount equal to a few hundredths of a percent of the weight of the peroxidized oil, the finished bread exhibiting a flavor considered by most scorers to be superior to that of bread made in accordance with Example 2 without the diacetyl.

The continuous breadmaking process to which the invention applies is unique in that the use of minor proportions of solid shortening is advantageous. This characteristic of the continuous process arises because of the tendency for the bread to have weak or caved side walls if the overall melting point of the total shortening is not maintained at a fairly high level. I have found it particularly advantageous, in accordance with the invention, to employ the special enzyme-peroxidized oil as the major constituent of a plastic shortening composition having a congealing point in the range of from 77° F. to 100° F. The use of such a plastic composition has the advantage that incorporation of the enzyme-peroxidized oil does not effectively lower the overall melting point of the shortening content of the preliminary dough mixture.

The plastic shortening composition of the invention can contain 15–30% by weight of a hardened fat, and 85–70% by weight of the enzyme-peroxidized oil. Any conventional hardened fat can be employed, and I find fully hydrogenated peanut oil (peanut stearin) and fully hydrogenated cottonseed oil to be particularly useful.

To take maximum advantage of the flavor-promoting capabilities of the special enzyme-peroxidized oils employed in accordance with the invention, it is desirable to accomplish rapid dispersion of the peroxidized oil throughout the dough mixture. Accordingly, in addition to the peroxidized oil and hardened fat, my novel compositions can comprise 0.1–10.00% by weight of the mono- and diglyceride emulsifiers. While any of the monoglycerides, mixed mono- and diglycerides, and diglycerides can be employed, glyceryl monostearate and glyceryl monopalmitate are typical. Similarly, monoglyceride esters, such as the diacetyl tartaric acid ester of glyceryl monostearate, are particularly useful. The effect of such agents, uniformly incorporated in the plastic shortening compositions, is to assure prompt dispersion and emulsification of the enzyme-peroxidized oil in the aqueous phase of the dough mixture during mixing and working of the dough.

The compositions are prepared by melting the hardened fat and uniformly mixing it with the peroxidized oil, and the emulsifier if one be employed, the molten product then being rapidly chilled to provide a solidified fat characterized by extremely small crystal size. Chilling of the molten mixed composition can be accomplished by flowing the same in the form of a thin film on the cooled surface of a chill roll. It is particularly effective, however, to accomplish this result in the conventional apparatus commonly known as a "Votator," in which the molten material is simultaneously agitated and chilled. Advantageously, nitrogen is injected into the fat to assure production of an especially smooth, uniform product.

By the term "triglyceride lipoxidase" I refer to lipoxidase which is preferentially active on triglyceride substrates, as contrasted to "fatty acid lipoxidase," which is preferentially active on fatty acid substrates, such as linoleic acid. Natural lipoxidase source materials do not contain only one of these two types of lipoxidase but rather contain both types in ratios dependent upon the nature of the source material. Thus, soybeans, which are unsuitable as enzyme source materials in accordance with the invention, are rich in both types of lipoxidase, while peas, for example, which are suitable enzyme source materials for the invention, show preponderantly triglyceride lipoxidase activity.

It has been pointed out that the oils suitable for the invention contain no, or only a negligible amount, of linolenic acid. Oils like cottonseed oil and peanut oil contain, essentially, zero linolenic acid. Sunflower oil, on the other hand, contains about 0.1% by weight linolenic acid, and poppyseed oil contains about 0.6% by weight linolenic acid, and both of these oils are suitable for use in accordance with the invention. Speaking of oils generally, those which have a linolenic acid content in excess of 1.0% by weight are unsuitable for use in accordance with the invention.

It will be understood by those skilled in the art that various specific embodiments of the invention have been

What is claimed is:

1. In the production of white bread by the continuous method comprising preparing an aqueous, yeast-fermented brew, continuously combining the brew with dough forming ingredients comprising at least flour and shortening to provide a preliminary dough mixture, and continuously subjecting the preliminary dough mixture to a short-term, high-energy working step adequate to develop a completed dough in times as short as a fraction of one minute, the improvement comprising continuously incorporating in the preliminary dough mixture an edible, refined, triglyceride-lipoxidase-peroxidized oil containing from none to a negligible amount of linolenic acid, said peroxidized oil having an active peroxide content, calculated as hydrogen peroxide, of 0.025–0.200 mole per kilogram, said peroxidized oil being incorporated in the preliminary dough mixture at a rate providing a proportion thereof amounting to 0.1–1.0% of the flour weight, and baking the fully developed dough to obtain finished white bread of improved flavor.

2. The method of claim 1 and wherein said oil has an active peroxide content of 0.140–0.150 mole per kilogram and is incorporated at a rate providing a proportion thereof, in the preliminary dough mixture, equal to 0.2–0.5% of the flour weight.

3. In the production of white bread by the continuous method comprising preparing an aqueous, yeast-fermented brew, continuously combining the brew with dough forming ingredients comprising at least flour and shortening to provide a preliminary dough mixture, and continuously subjecting the preliminary dough mixture to a short-term, high-energy working step adequate to develop a completed dough in times as short as a fraction of one minute, the improvement comprising continuously incorporating in the preliminary dough mixture a flavor-promoting shortening composition comprising an edible, refined, triglyceride-lipoxidase-peroxidized oil which contains no more than a negligible amount of native linolenic acid, said peroxidized oil having an active peroxide content, calculated as hydrogen peroxide, of 0.025–0.200 mole per kilogram, said peroxidized oil being incorporated in the preliminary dough mixture at a rate providing a proportion thereof amounting to 0.1–1.0% of the flour weight, said composition also containing a minor proportion of a butter flavor agent; and baking the fully developed dough to obtain finished white bread of improved flavor.

4. In the production of white bread by the continuous method comprising preparing an aqueous, yeast-fermented brew, continuously combining the brew with dough forming ingredients comprising at least flour and shortening to provide a preliminary dough mixture, and continuously subjecting the preliminary dough mixture to a short-term, high-energy working step adequate to develop a completed dough in times as short as a fraction of one minute, the improvement comprising continuously incorporating in the preliminary dough mixture a flavor-promoting homogeneous plastic shortening composition comprising 15–30% by weight of a hardened fat and 85–70% by weight of an edible, refined, triglyceride-lipoxidase-peroxidized oil which contains no more than a negligible amount of native linolenic acid, said peroxidized oil having an active peroxide content, calculated as hydrogen peroxide, of 0.025–0.200 mole per kilogram, said composition being incorporated in the preliminary dough mixture at a rate providing a proportion of said peroxidized oil amounting to 0.1–1.0% of the flour weight, and baking the fully developed dough to obtain finished white bread of improved flavor.

References Cited in the file of this patent

UNITED STATES PATENTS

| | | |
|---|---|---|
| 1,994,993 | Haas et al. | May 19, 1935 |
| 2,931,320 | Bandel | Apr. 5, 1960 |
| 2,935,460 | Baker | Sept. 20, 1960 |